United States Patent [19]

Turner

[11] Patent Number: 4,488,288
[45] Date of Patent: Dec. 11, 1984

[54] END-TO-END INFORMATION MEMORY ARRANGEMENT IN A LINE CONTROLLER

[75] Inventor: Jonathan S. Turner, Evanston, Ill.

[73] Assignee: AT&T Bell Laboratories, Murray Hill, N.J.

[21] Appl. No.: 392,227

[22] Filed: Jun. 25, 1982

[51] Int. Cl.³ .............................................. H04J 6/00
[52] U.S. Cl. .................................................... 370/60
[58] Field of Search ............................ 370/60, 94, 58

[56] References Cited

U.S. PATENT DOCUMENTS

| | | | |
|---|---|---|---|
| 4,079,209 | 3/1978 | Schwerdtel | 370/60 |
| 4,081,612 | 3/1978 | Hafner | 370/60 |
| 4,261,052 | 4/1981 | Persson et al. | 370/60 |
| 4,354,263 | 10/1982 | Bordry et al. | 370/60 |
| 4,399,531 | 8/1983 | Grande et al. | 370/60 |
| 4,408,323 | 10/1983 | Montgomery | 370/60 |

FOREIGN PATENT DOCUMENTS 48860  4/1982  European Pat. Off. .

OTHER PUBLICATIONS

T. H. Beeforth et al., "Proposed Organisation for Packet-Switched Data Communication Network", Proc. I.E.E., vol. 119, No. 12, Dec. 1972, pp. 1677–1682.
M. Schwartz et al., "Routing Techniques used in Computer Communication Networks", IEEE Trans. on Comm., vol. COM-28, No. 4, Apr. 1980, pp. 539–552.
J. Lui, "Distributed Routing and Relay Management in Mobile Packet Radio Networks", Compcon 80, Sep. 25, 1980, pp. 235–243.
M. A. Bergamo et al., "REXPAC-A Brazilian Packet Switching Data Network", Proc. of the 5th ICCC, Oct. 1980, pp. 17–22.

Primary Examiner—Douglas W. Olms
Assistant Examiner—Wellington Chin
Attorney, Agent, or Firm—J. C. Moran

[57] ABSTRACT

A communication method and packet switching system in which packets comprising physical addresses and voice/data information are communicated through the system by packet switching networks which are interconnected by high-speed digital trunks with each of the latter being directly terminated on both ends by trunk controllers. Customer terminals are connected to the switching system by access line controllers which insert the physical addresses into the packets. The line controllers attach to concentrators which are interconnected to the switching networks via high-speed digital trunks. During initial call setup of a particular call, the physical addresses are obtained and stored in the line controllers by the transmission of a cell setup packet and call reply packet between the originating and destination line controllers. Each processor inserts into the call setup packet the necessary addressing information to route packets through the associated network. Each network comprises stages of switching nodes which are responsive to the physical addresses in a packet to communicate this packet to a designated subsequent node. The nodes provide for variable packet buffering, packet address rotation techniques, and intranode and internode signaling protocols.

43 Claims, 20 Drawing Figures

| ADDRESS FIELD | | | | | DATA FIELD | | | | | | |
|---|---|---|---|---|---|---|---|---|---|---|---|
| PACKET LENGTH | CONTROL FIELD | TRUNK CONTROLLER ID NO OF μPROCESSOR 125 | CALL SETUP | DIALED PHONE NO | LINE 122 | TRUNK 117 | TRUNK 118 | TRUNK 119 | TRUNK 120 | TRUNK 124 | CRC |

FIG. 3

| PACKET LENGTH | CONTROL FIELD | ADDRESS FIELD | DATA FIELD | | CRC |
|---|---|---|---|---|---|
| | | TRUNK ID NO. OF MICROPROCESSOR 111 | CALL SETUP | DIALED PHONE NO. | LINE 122 |

FIG. 4

| PACKET LENGTH | CONTROL FIELD | ADDRESS FIELD | DATA FIELD | | | | CRC |
|---|---|---|---|---|---|---|---|
| | | ID NO OF TRUNK CONTROLLER 129 | CALL SETUP | DIALED PHONE NO. | LINE 122 | TRUNK 117 | |

FIG. 5

| PACKET LENGTH | CONTROL FIELD | ADDRESS FIELD | DATA FIELD | | | | | CRC |
|---|---|---|---|---|---|---|---|---|
| | | TRUNK CONTROLLER ID NO. OF PROCESSOR 113 | CALL SETUP | DIALED PHONE NO. | LINE 122 | TRUNK 117 | TRUNK 118 | |

FIG. 6

| PACKET LENGTH | CONTROL FIELD | ADDRESS FIELD | DATA FIELD | | | | | | CRC |
|---|---|---|---|---|---|---|---|---|---|
| | | TRUNK CONTROLLER ID NO. OF PROCESSOR 123 | CALL SETUP | DIALED PHONE NO. | LINE 122 | TRUNK 117 | TRUNK 118 | TRUNK 119 | |

FIG. 7

| PACKET LENGTH | CONTROL FIELD | TRUNK CONTROLLER ID NO. OF PROCESSOR 114 | CALL SETUP | DIALED PHONE NO. | LINE 122 | TRUNK 117 | TRUNK 118 | TRUNK 119 | TRUNK 120 | CRC |
|---|---|---|---|---|---|---|---|---|---|---|
| | | ADDRESS FIELD | | DATA FIELD | | | | | | |

FIG. 8

| PACKET LENGTH | CONTROL FIELD | TRUNK CONTROLLER ID NO. OF µPROCESSOR 125 | CALL SETUP | DIALED PHONE NO. | LINE 122 | TRUNK 117 | TRUNK 118 | TRUNK 119 | TRUNK 120 | TRUNK 124 | CRC |
|---|---|---|---|---|---|---|---|---|---|---|---|
| | | ADDRESS FIELD | | DATA FIELD | | | | | | | |

FIG. 9

| PACKET LENGTH | CONTROL FIELD | TRUNK 124 OF 126 | TRUNK CONTROLLER 150 ID | TRUNK CONTROLLER 147 ID | TRUNK CONTROLLER 140 ID | TRUNK CONTROLLER 130 ID | TRUNK CONTROLLER ID NO. OF µPROCESSOR 111 | REPLY | TRUNK 117 OF 112 | TRUNK CONTROLLER 131 ID | TRUNK CONTROLLER 142 ID | TRUNK CONTROLLER 149 ID | TRUNK CONTROLLER 141 ID | LINE 121 OF 126 | CRC |
|---|---|---|---|---|---|---|---|---|---|---|---|---|---|---|---|
| | | ADDRESS FIELD | | | | | | | DATA FIELD | | | | | | |

INFORMATION ULTIMATELY STORED IN ADDRESS MEMORY 138

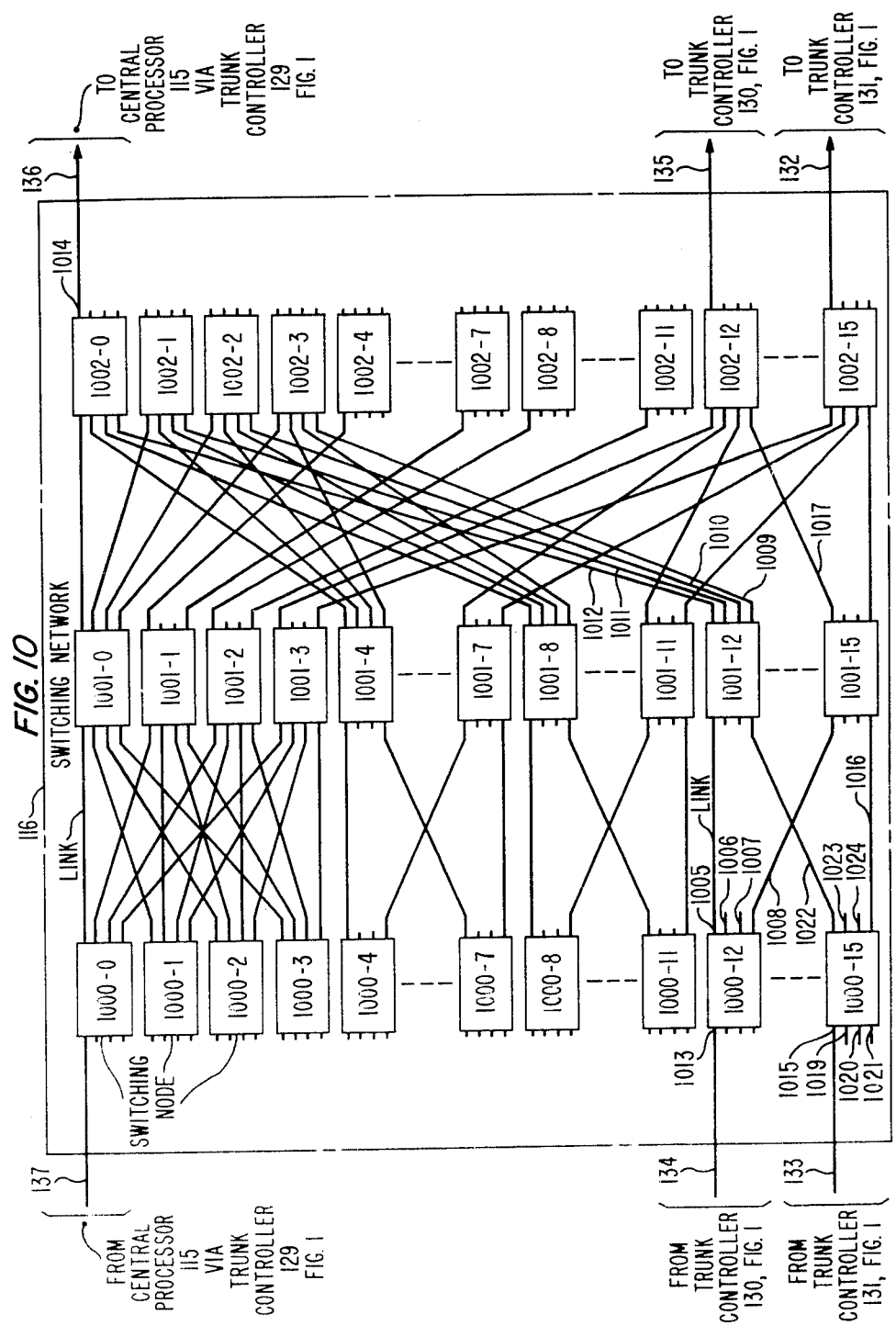

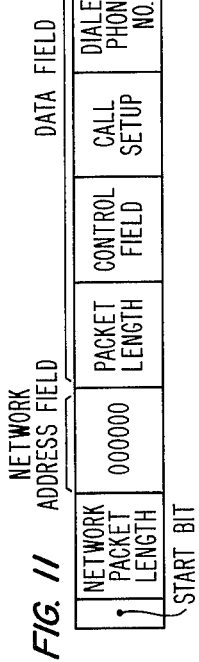
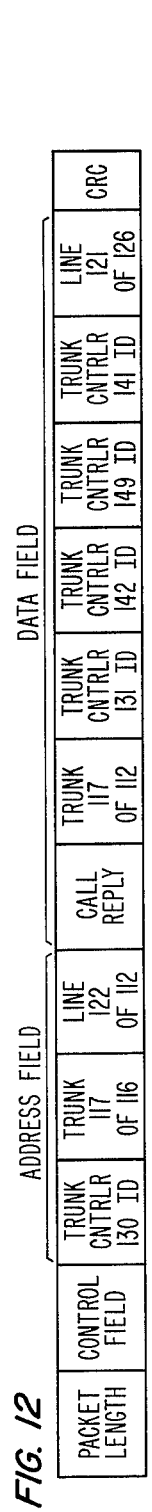
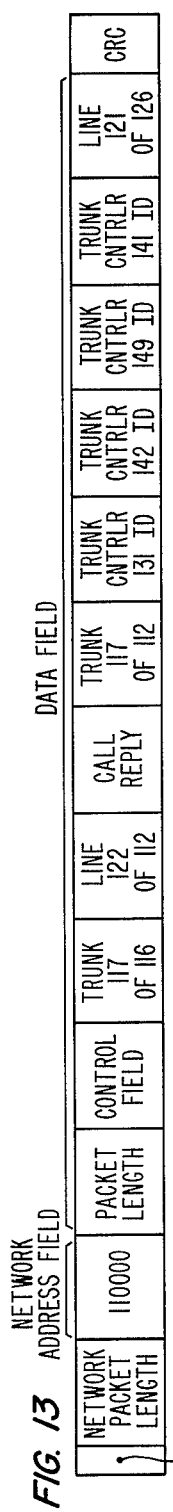
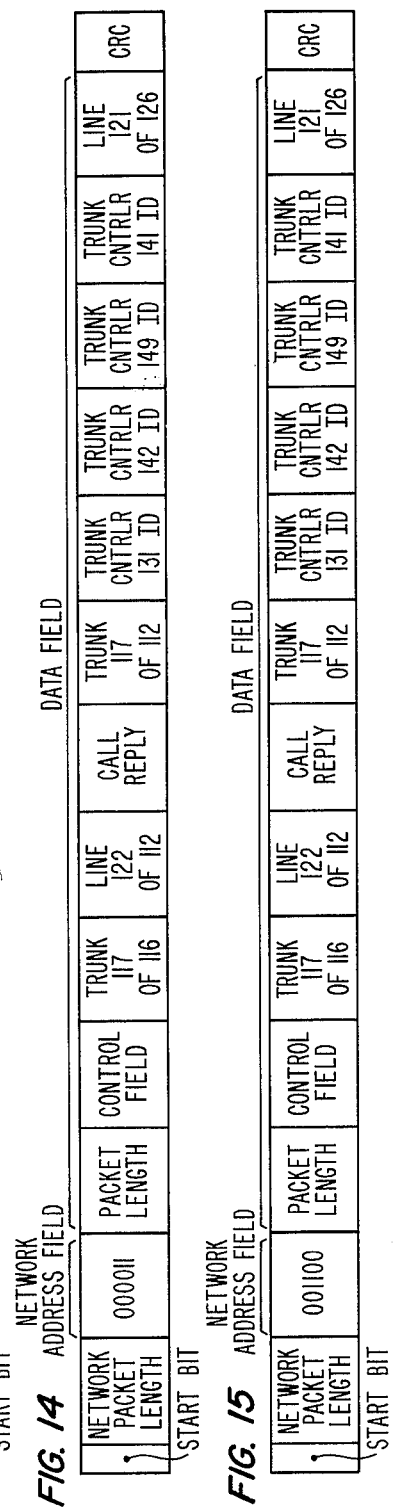

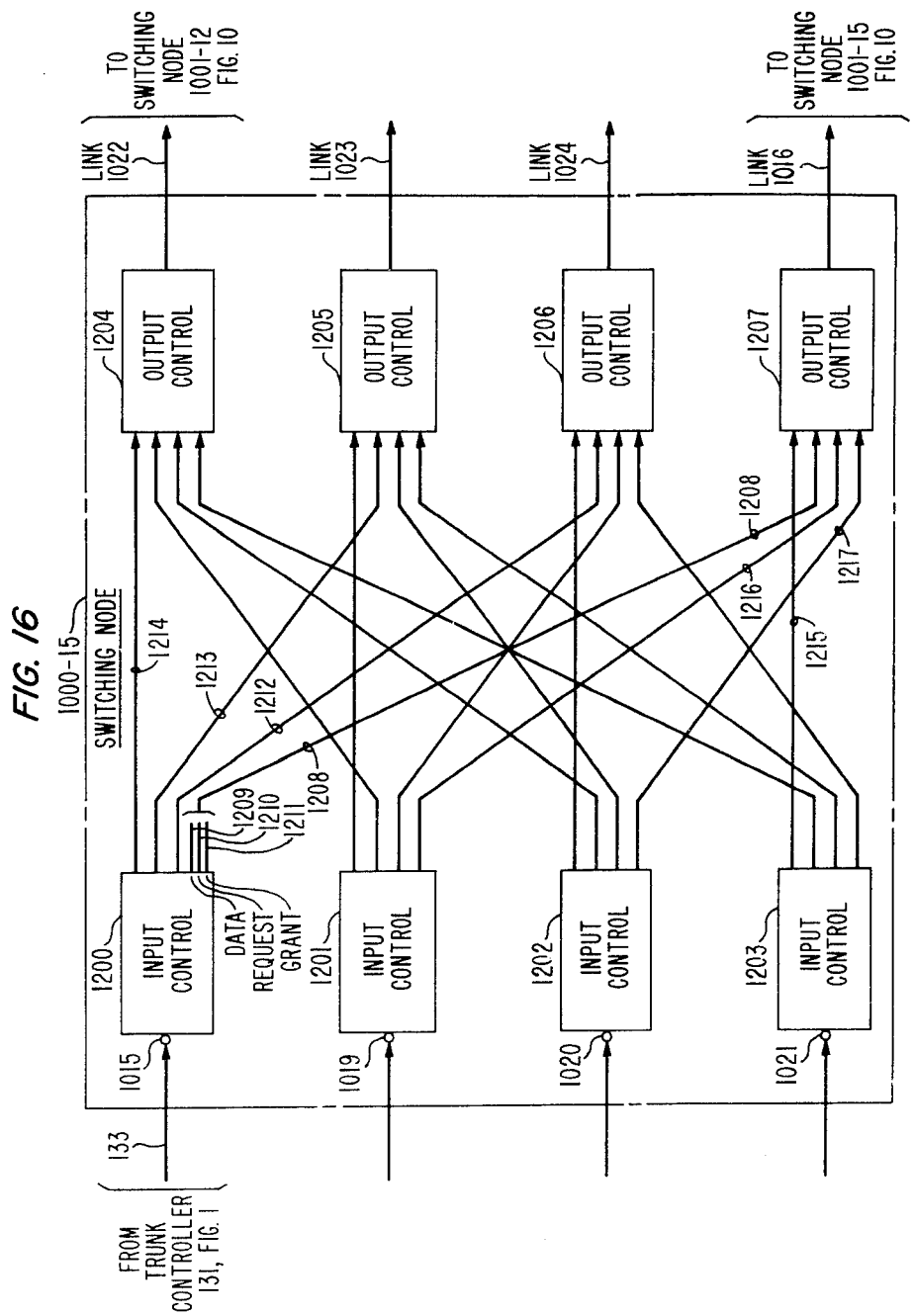

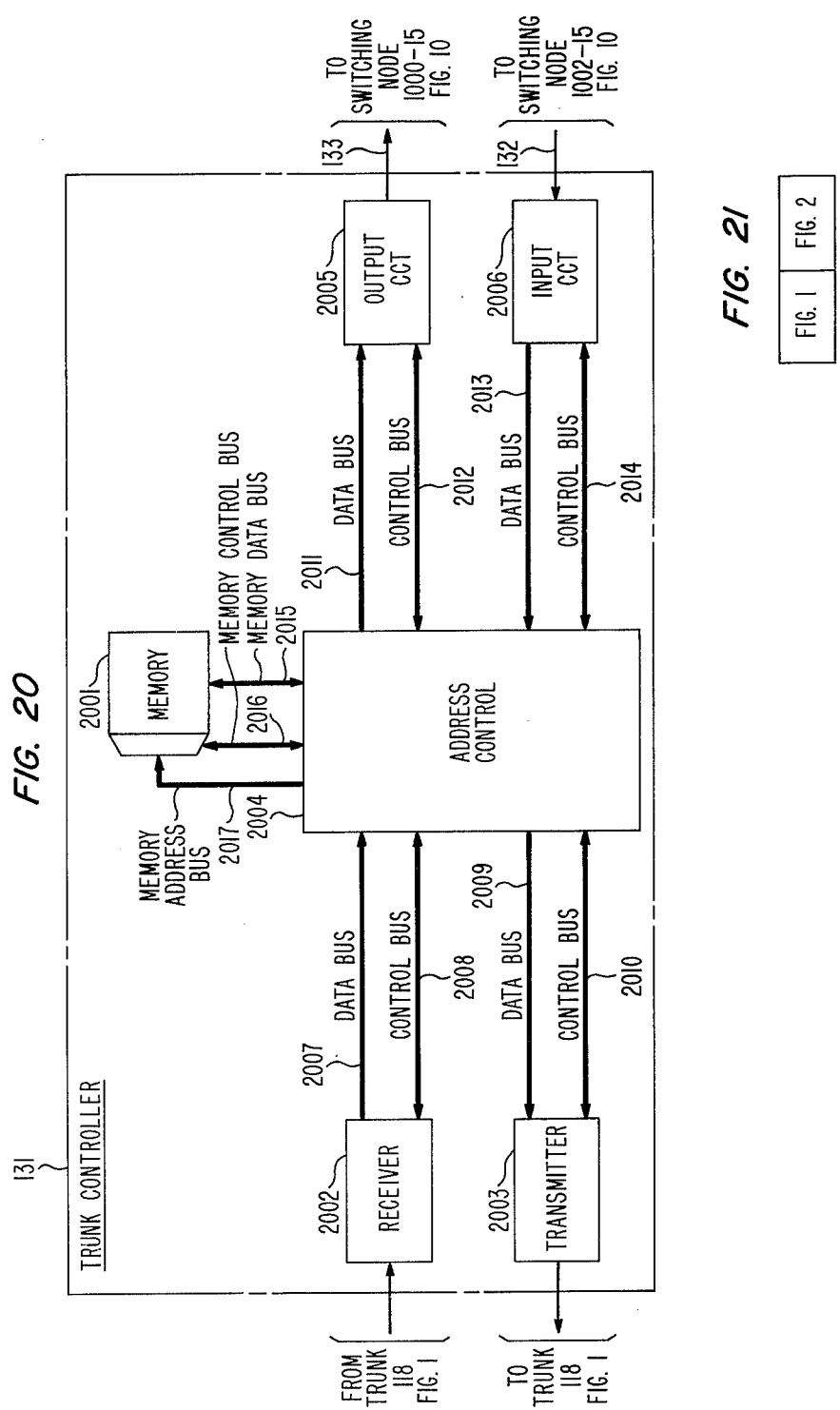

END-TO-END INFORMATION MEMORY ARRANGEMENT IN A LINE CONTROLLER

CROSS-REFERENCE TO RELATED APPLICATIONS

Concurrently filed herewith and assigned to the same assignee as this application are:
- J. S. Turner, Case 1, "Fast Packet Switch", Ser. No. 392,378;
- J. S. Turner, Case 2, "An Interface Facility for a Packet Switching System", Ser. No. 392,228;
- J. S. Turner, Case 4, "Packet Switching Loop-Around Network and Facilities Testing", Ser. No. 392,381;
- W. A. Montgomery, Case 2, "Time Stamping for a Packet Switching System", Ser. No. 392,377;
- J. S. Turner, Case 8, "Fast Packet Switching System", Ser. No. 393,112.

TECHNICAL FIELD

This invention relates to a method and packet switching facilities for the communication of integrated voice and data signals. The method and packet switching facilities provide for route selection and automatic routing of packets containing voice or data information through the packet switching system.

BACKGROUND OF THE INVENTION

Packet switching provides a known solution to problems where the information to be transmitted occurs in short, high-rate burst with long pauses in between bursts. The use of packets allows efficient utilization of the switching and transmission facilities. A packet consists of a predetermined number of data bits, together with synchronization and other identifying data. The use of low-bit rate encoding techniques coupled with not transmitting silent periods results in digitally-encoded voice information having characteristics which are very similar to those of data information— short, high-rate busts with longer pauses in between bursts. Despite the fact that voice information has not been considered well suited for transmission in the form of packets, the transmission of voice information in the form of packets is a desirable result. Not only would the packetizing of low-bit rate voice encoded information result in a more economic and more effective switching system, it would also allow the introduction of a totally integrated voice and data packet system. Such an integrated system would allow the effective implementation of enhanced voice and data services for example on a nationwide basis.

A principal reason for not considering voice information well suited for transmission in the form of packets is that voice information cannot tolerate long delays during transmission. Delays in excess of 250 milliseconds have been found to be unacceptable for voice communication. In contrast, delays of many seconds for data are not objectionable.

Prior art systems for switching packets have been rather small systems consisting of only a few hundred nodes and are designed to switch packets containing data information. In addition, such systems have employed large computers using sophisticated software packages to perform the packet switching functions at each node within the system. These systems have utilized complex control protocols to handle the problems of error recovery and flow control and to perform the route identification functions. As a result, the prior art systems have had a limited packet handling capability being capable of handling only a few thousand packets per second. A recognized disadvantage in such systems is that the complex control protocols introduce a large amount of delay into the transmission of a packet. For example, when a packet was received the computer had to examine the logical address to determine the destination of the packet and then take the necessary steps to transmit the packet to that destination. That process involved the time consuming steps of translating the logical address into a physical address designating the transmission link over which the packet was to be retransmitted and then actually retransmitting the packet after performing the necessary error and flow control. Because of the large number of time consuming steps required to translate the logical address into the physical address, the prior art systems required a large number of buffers to store packets which were awaiting address translation and retransmission. This large number of buffers increased the size of the prior art systems, and introduced a large amount of time delay. Since the time delay was introduced at each switching node, the total delay of a particular packet depended on the number of switching nodes through which the packet was transmitted. For a large number of nodes, the delay became quite unacceptable, with respect to the transmission of packetized voice.

The prior art systems have proven non-desirable for implementing a national telecommunication switching network function because of the delay which they would introduce and because such systems would be physically too large, complex, and expensive if expanded to perform this function.

In light of the foregoing, it can be seen that there exists a need for a packet switching system which can transmit packets with a minimum amount of delay. The architecture of the packet switching system should be such that the time consuming logical-to-physical address translation functions are not performed at each node of the packet switching system. In addition, the architecture of the packet switching system should be such that a high capacity system can be constructed which has a reasonable physical size and desirably allow the utilization of very large scale integration (VLSI).

SUMMARY OF THE INVENTION

The foregoing problems are solved and a technical advance is achieved in accordance with the principles of this invention incorporated in an illustrated method and structural embodiment in which voice and data packets are routed through a packet switching system on the basis of a self-contained physical address which is inserted into each packet at the packet's entry point into the system. The packet switching system comprises switching networks each of which is under the supervisory control of a central processor. The physical addressing information is stored at the entry point. This information is first obtained by the use of a call setup packet being transmitted through the packet switching system. The call setup packet is routed from the entry point to each processor supervising a switching network in the desired route. Each processor inserts into the call setup packet the necessary addressing information to route packets through the associated switching network. Each processor calculates this physical address information on the basis of a logical address contained within the call setup packet. When the call setup packet reaches the destination point of the switching system, the destination point stores the physical address information necessary to route packets from the destination point to the entry point. In addition, the destination point transmits a call-reply packet to the entry point. The call-reply packet contains the necessary physical addressing information which is to be inserted into the subsequent packets to route packets between the entry point to the destination point. Once the call-reply packet has been received, both the entry and destination points have the necessary physical address information to allow packets to be routed through the packet switching system without further intervention of the various processors. Since the intervention of the processors is not required nor is logical-to-physical address translation required at each switching network, the invention allows for the transmission of packets with a minimum amount of delay.

The packet switching system comprises a switching office which has a processor and a network having a number of interconnected switching elements. These switching elements are responsive to address fields of packets which are being transmitted through the switching elements to properly switch those packets to the next sequential element.

Connected to the packet switching system are units of customer equipment which establish routes through the switching system and via these routes interchange packets of voice and data information. The address information is inserted into each packet by a transmitting customer equipment unit and determines the entire route through the packet switching system.

Address information is compiled by the originating customer equipment unit first transmitting a call setup packet which defines the destination unit to the processor of the switching office. The processor responds to that call setup packet by calculating the address information necessary to route packets through the switching elements between the originating customer unit and the destination customer unit. The processor then inserts that address information into the call setup packet and transmits the entire packet to the destination customer unit. The latter stores the compiled address information for use in subsequent transmission of packets of data and voice information back to the originating customer unit. After storing the compiled address information, the destination customer unit assembles a call-reply packet having the compiled address information advantageously inserted into both the address field and the data field. The address information is inserted into the address field so that the call-reply packet is routed through the switching elements back to the originating customer unit. The call-reply jacket is used to transfer the compiled address information to the originating customer unit by including that information in the data field. The switching elements within the switching office are responsive to the address information contained in the address field to route the packet to the originating customer unit.

Upon receipt of the call-reply packet, the originating customer unit stores the address information whih will be used for subsequent transmission of packets to the destination customer unit.

The packet switching system includes a number of interconnected switching offices each of which has its own processor. When the packet switching system comprises of a number of switching offices, the call setup packet is transmitted from the originating customer unit to each switching office which is in the route to the destination customer unit. Each processor in the route inserts the necessary address information to route subsequent packets through that particular switching office.

Upon receipt of the call setup packet, the destination customer unit transmits a call-reply packet which is routed back to the originating customer unit via the switching offices.

When the route has been established for the transmission of voice signals from a telephone set connected to the originating customer unit, the originating customer unit responds to analog signals received from the telephone to digitally encode and to assemble them into packets. After each packet is assembled, the originating customer unit inserts the stored address information into the packet and transmits it to the switching office.

In addition to the processor and the switching elements, each switching office has a plurality of interface facilities which are used to connect the switching elements to the customer units and to other switching offices. Upon receipt of a packet from a customer unit, an interface facility forms an intranetwork packet by extracting that portion of the address information from the packet necessary to route the packet through the switching elements of the switching office to which the interface facility is connected. The intranetwork packet is formed by placing that portion of the address information in the front of the original packet. Upon receiving an intranetwork packet, an interface facility strips off the added address information and transmits only the original packet to the connected customer unit or switching office.

The interface facilities transmit the intranetwork packets to the switching element in a bit serial transmission mode. The switching element is responsive to the leading address information to utilize the two most significant bits to determine which is the next sequential switching element to receive the intranetwork packet. Before transmitting the intranetwork packet to the nxt sequential switching element, the switching element rotates the address field so that the two most significant bits become the two least significant bits.

The novel method is provided for routing packets of digital signals through a packet switching system which interconnects a number of customer units by means of a switching network. The switching network consists of a number of interconnected switching elements and a processor. Each packet has an address which is used by the switching elements to route the packet through the switching network. The customer unit inserts the address into the packet before transmitting the packet to the switching network. The steps involved in compiling the address comprise the originating customer unit transmitting a call setup packet to the processor. The processor performs the steps of inserting the address into the call setup packet and transmitting the call setup packet to the destination customer unit. The destination customer unit stores the address and transmits it to the originating customer unit in a call-reply packet. After receiving the call-reply packet, the originating customer unit stores the address.

If the packet switching system comprises more than one switching network, then the call setup packet is transmitted to each processor which has a switch network in the packet route. Each processor inserts the address information required to route packets through its associated switching network.

BRIEF DESCRIPTION OF THE DRAWING

FIGS. 3 through 8 illustrate the contents of a call setup packet as it is routed from an originating customer terminal to a destination customer terminal through the switching system;

FIG. 9 illustrates the contents of the call reply packet transmitted from the destination customer terminal to the originating customer terminal in response to the receipt of the call setup packet;

FIG. 10 is a detailed block diagram of switching network 116;

FIG. 11 illustrates an intranetwork packet which is used to route the call setup packet of FIG. 4 from trunk controller 130 to central processor 115 via switching network 116;

FIG. 12 illustrates a packet which is to be routed from trunk controller 131 to trunk controller 130 via switching network 116;

FIGS. 13 through 15 illustrate the contents of the intranetwork packet used to transport the packet of FIG. 12 through switching network 116;

FIG. 16 is a detailed block diagram of switching node 1000-15;

FIG. 20 is a detailed block diagram of trunk controller 131.

DETAILED DESCRIPTION

Figure 1:
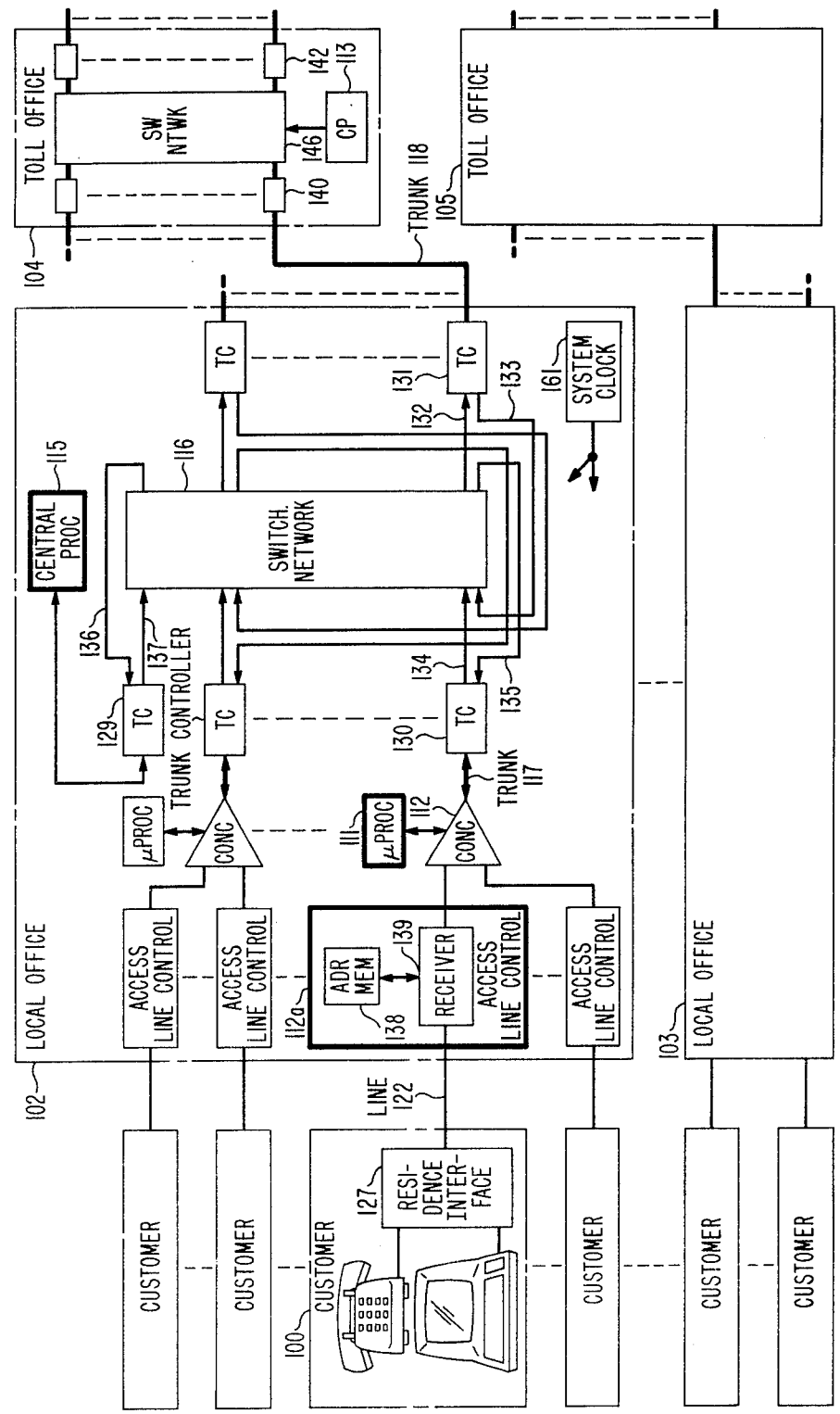
FIGS. 1 and 2 illustrate, in block diagram form, a communication switching system utilizing packet routing in accordance with the present invention.
Figure 2:
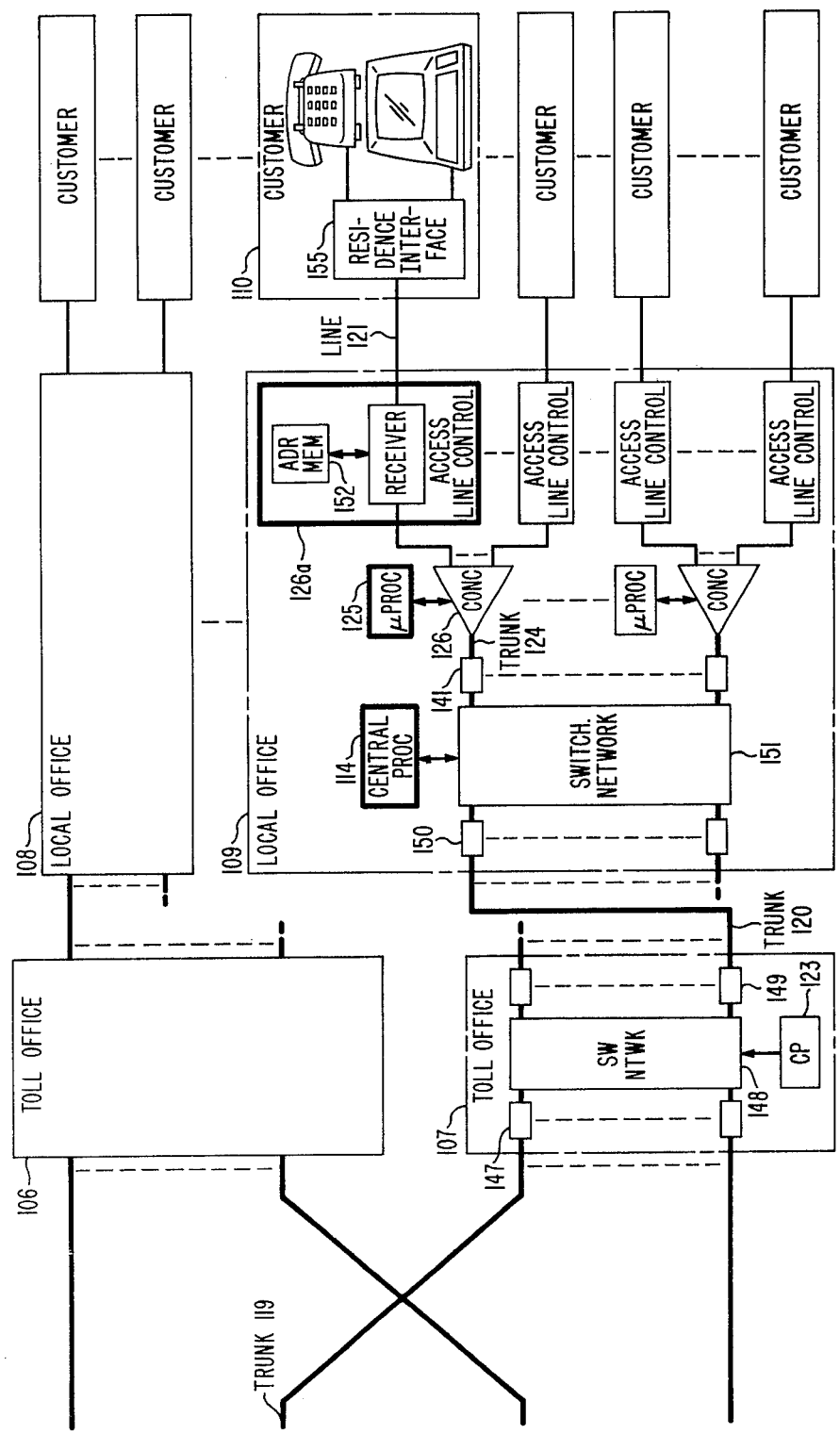

FIGS. 1 and 2 show an illustrated packet switching system having a plurality of local offices 102, 103, 108 and 109, and a plurality of toll offices 104 through 107 serving a plurality of customers such as customers 100 or 110. The purpose of this description is to illustrate how packets are transmitted between customers such as customers 100 and 110. This section first describes the manner in which a packet to be transmitted from customer 100's resident interface 127 has the necessary self-routing information inserted into it by the attached access line controller 112a and how the packet is then routed through the packet switching system to the destination access line controller 126a and then to customer 110. Once the routing of the packet through the switching network has been described, the procedure used to compile the routing information is then described; and then, the method used to store the information within the access line controllers is described. After this overall introduction has been given, the necessary details of each block of FIGS. 1 and 2 are given.

As shown in FIG. 1, local office 102 comprises a switching network 116 which terminates a plurality of trunk controllers and which cooperates with central processor 115 via a central processor trunk controller 129 which is also connected to the switching network. Each trunk controller is tied into the network by unilateral transmission media. Trunk controller 131, for example, receives information from switching network 116 via conductor 132 and transmits information to switching network 116 via conductor 133.

On the customer side of local office 102, the local office is connected to customers via concentrators which are interconnected to the switching network via trunk controllers. A concentrator has an internal switching architecture similar to that of switching network 116 which is described in greater detail later. Each concentrator has connected to it a microprocessor which is used in conjunction with the attached access line controllers to perform the initial call setup sequences and to provide call supervision as a supplement to the inherent self-routing characteristics of the packets being transmitted through the packet switching system. The customer units are connected to the concentrators by the access line controllers. Each access line controller stores address and control information which is stored in the access line controller by the controlling microprocessor. This information is used to control the route taken by packets transmitted through the packet switching system by the customer unit. Each access line controller is connected to a residence interface contained within each customer unit via standard bilateral transmission media. Packets are transmitted between the access line controllers and the residence interfaces using standard packet protocols. The subject matter of FIG. 1 is substantially duplicated in FIG. 2.

The following description illustrates in greater detail the manner in which the self-routing information is obtained and subsequently stored in address memories of the appropriate access line controllers. This information is obtained by a call setup packet being transmitted from the appropriate access line controller connected to the originating customer unit through the various microprocessors and central processors which are associated with the different concentrators and local and toll offices which form the route through which the call setup packet must transverse in order to reach the destination customer unit. As the call setup packet progresses along this route, each processing entity augments the address route information by inserting into this information the necessary address information to route packets through the switching network associated with that particular processing entity.

Once the call setup packet is received at the destination customer unit, the information required for the destination customer unit to directly route packets back to the originating customer unit is stored in the address memory of the access line controller associated with the destination customer unit; and the microprocessor assembles and transmits a call-reply packet containing this information to the microprocessor associated with the originating customer unit. Upon receipt of the call-reply packet, the microprocessor associated with the originating customer units stores the information in the associated access line controller.

After the information contained in the call-reply packet is stored in the originating customer access line controller, both access line controllers have the necessary routing information so that packets can be directly routed through the switching networks without the packets having to be handled by the associated processing entities.

The utilization of the call setup packet is now illustrated in greater detail by describing the establishment of a telephone call between customers 100 and 110. Customer 100 calls customer 110 by dialing customer 110's telephone number. Residence interface 127 collects the dialed digits in the conventional manner. After residence interface 127 has collected the dialed digits, it transmits the dialed digits in a packet via line 122 to access line controller 112a.

In response to the packet received from residence interface 127, access line controller 112a assembles and transmits the packet shown in FIG. 3 to microprocessor 111 via concentrator 112. The address field of that packet designates the trunk connecting microprocessor 111 to concentrator 112, and concentrator 112 responds to the address field by routing the packet to the designated trunk. The data field contains a header that designates the packet as a call setup packet, a field containing the dialed telephone number, and a field identifying line 122's connection.

Upon receipt of the packet of FIG. 3, microprocessor 111 examines the dialed telephone number and determines that a connection is required through switching network 116. Microprocessor 111 assembles the packet shown in FIG. 4 and transmits this packet to switching network 116 via trunk 117. In the field designated trunk 117, microprocessor 111 only stores the identification number for trunk 117's connection to access line controller 112a. The address field is changed to contain the identification number of trunk controller 129 so that network 116 routes the packet of FIG. 4 to processor 115.

Upon receipt of the packet shown in FIG. 4, processor 115 determines from the dialed telephone number by performing a table look-up operation that the call must be set up through toll office 104. Processor 115 next assembles the packet shown in FIG. 5. Processor 115 adds the identification number of trunk controller 130 into the field designated as trunk 117 and the identification number of trunk controller 131 into the field designated trunk 118. This packet is then transmitted to toll office 104 from processor 115 via trunk controller 129, network 116, trunk controller 131, and trunk 118.

Upon receipt of the packet of FIG. 5, processor 113 assembles the packet shown in FIG. 6 on the basis of the dialed telephone number. Processor 113 updates the trunk 118 field to include the number for trunk controller 140 and inserts into the field designated trunk 119 the identification number of the trunk controller 142. After the packet has been assembled as illustrated in FIG. 6, processor 113 transmits that packet to toll office 107 via network 146, trunk controller 142, and trunk 119.

Upon receipt of the packet of FIG. 6, processor 123 assembles the packet of FIG. 7 by inserting the identification numbers of trunk controllers 147 and 149 into the fields designated trunks 119 and 120 and transmits that packet to processor 114 via network 148, trunk controller 149, trunk 120, and network 151. Upon receipt of the packet from processor 123, processor 114 transmits to microprocessor 125 via trunk 124 the packet shown in FIG. 8.

When the packet illustrated in FIG. 8 is received by microprocessor 125, the latter transmits that portion of the data field containing the identification numbers of trunk controllers 150, 147, 140 and 130 and line 122 to access line controller 126a which stores these numbers in address memory 152. These identification numbers define the route from access line controller 126a to access line controller 112a. In addition, microprocessor 125 transmits that portion of the data field containing the identification numbers of trunk controllers 131, 142, 149, and 141, and line 121 to access line controller 112a by assembling and transmitting the packet shown in FIG. 9 to microprocessor 111. Upon receipt of this packet, microprocessor 111 transmits the data field to access line controller 112a which stores it in address memory 138. The address field of the packet shown in FIG. 9 contains the identification numbers of the trunk controllers through which the packet must be transmitted in order to reach microprocessor 111. The various networks respond to these identification numbers to route the packet to microprocessor 111. Once the packet illustrated in FIG. 9 is received by microprocessor 111, and the latter has transmitted the contents of the data field to access line controller 112a, both access line controller 112a and 126a have the routing information for the transmission of packets between customers 100 and 110.

Network 116 of office 102 is shown in greater detail in FIG. 10. All connections to switching network 116 are made through the trunk controllers shown on FIG. 1. Each trunk controller is capable of buffering up to five packets of information from the attached trunk. The buffering of packets at the input from the trunks allows for delays encountered in retransmitting by the trunk controller due to overload conditions in network 116. Buffering is also provided by the trunk controllers for information being received from the network before it can be retransmitted on the attached trunk. Each trunk controller is capable of buffering up to 40 packets of information from the network before commencing retransmission out on the trunk. Each trunk controller has one input connection and one output connection to network 116. For example, trunk controller 130 transits information to network 116 via conductor 134 and receives data from network 116 via conductor 132 as shown in FIG. 10.

The network itself comprises three stages of switching nodes 1000 through 1002. The first stage comprises nodes 1000-0 through 1000-15, the second stage comprises nodes 1001-0 through 1001-15 and the third stage comprises nodes 1002-0 through 1002-15. Transmission through the network is from left to right. Each node, such as node 1000-15, is a small packet switch as shown in FIG. 16. Each node has four inputs, such as inputs 1015 and 1019 through 1021, and is capable of buffering one packet on each input. The packets received on any input are transmittable on any of four output links, such as links 1016 and 1022 through 1024 of node 1000-5. After receipt of a packet on an input terminal, the address contained in that packet is used by the node to select the output link for retransmission of the packet. Only the two most significant bits of the address are used to designate the output link for a particular node. For example, node 1000-12 retransmits the packet on link 1005 if the most significant bits are equal to zero, on link 1006 if the most significant bits are equal to one, on link 1007 if the most significant bits are equal to two, and on link 1008, if the most significant bits are equal to three.

After determining the output link, each node rearranges the address bits so that the receiving node in the next stage has the correct bits in the most significant bit positions in order to determine the output link for retransmission of the packet in that stage.

The operation of switching network 116 as shown in FIG. 10 can be better understood by reconsidering the example of the switching of the call setup packet shown in FIG. 4 from microprocessor 111 to central processor 115 via trunk 117, trunk controller 130, network 116, and trunk controller 129. The packet shown in FIG. 4 is transmitted by microprocessor 111 via trunk 117 to trunk controller 130. Upon receipt of that packet, controller 130 forms a new packet that is illustrated in FIG. 11. The packet of FIG. 11 consists of a start bit, a network address which contains the identification number of controller 129, a network packet length field, and a data field containing the packet of FIG. 4 with the exception of the address field. Controller 129's identification number is a "0" which is stored in the network address field as a binary number. Once the packet of FIG. 11 has been formed and input terminal 1013 of node 1000-12 is idle, controller 130 transmits this packet to node 1000-12 via conductor 134 and input terminal 1013.

Node 1000-12 decodes the two most significant bits of the address field and selects link 1005 since these bits are zero. Before transmitting the packet to node 1001-12 via link 1005, node 1001-12 rearranges the address field so that the address bits are properly positioned for node 1001-12 to decode. To accomplish this rearrangement, node 1000-12 rotates the address field two bits to the left which results in the two most significant bits becoming the least significant bits and the two middle bits of the address field shown in FIG. 11 becoming the two most significant bits.

Node 1001-12 decodes the address field upon receiving it and selects link 1012 since the two most significant bits are zero. Node 1001-12 also rotates the address field two bits to the left. Node 1001-12 transmits the packet to node 1002-0 via the link 1012. Upon receipt of the packet, node 1002-0 decodes the address field and selects output terminal 1014 which is connected to conductor 136, since the two most significant bits of the address are zero. Upon receiving the packet, trunk controller 129 transmits the data field to central processor 115. The start bit, network address field, and network packet length are not transmitted since these fields were only required for routing the packet through network 116.

To further illustrate the operation of switching network 116 as shown in FIG. 10, consider the routing of the call-reply packet through network 116, as was previously described in general terms, with respect to setting up the telephone call between customer units 100 and 110. The present discussion follows the transmission of the packet shown in FIG. 9 through switching network 116 from trunk 118 to trunk 117. The packet of FIG. 9 was initially transmitted by microprocessor 125 to concentrator 126. When the packet of FIG. 9 is finally received by controller 131, it has been modified during transmission to have the content shown in FIG. 12. The reason for this change is that as the packet is transmitted through local office 109, toll office 107, and toll office 104, the trunk designations for trunk 124, trunk 120, trunk 119, and trunk 118 have been eliminated from the address field of the packet in FIG. 9. Upon receipt of the packet shown in FIG. 12, controller 131 forms the packet shown in FIG. 13 by using the trunk controller 130 ID number from the address field of the packet of FIG. 12 for the network address field. After forming this packet, controller 131 transmits it to node 1001-15 via input terminal 1015 and conductor 133. Node 1000-15 decodes the two most significant bits of the network address field which is a binary "3" and selects and transmits the packet via link 1016 to node 1001-15. Before node 1000-15 starts to transmit the packet via link 1016, node 1000-15 performs a left rotate operation on the network address field resulting in the packet shown in FIG. 14. Upon receiving that packet, node 1001-15 decodes the two most significant bits of the network address field as shown in FIG. 14 and selects and transmits the packet on link 1017 to node 1002-12. Before transmitting the packet, switching node 1001-15 performs a left rotate operation on the packet resulting in the packet shown in FIG. 15. Upon receiving the packet of FIG. 15, node 1002-12 responds to the network address field by transmitting the packet to controller 130 via conductor 135. Node 1002-12 also performs the left rotate operation on the network address field. The packet which is transmitted to controller 130 via conductor 135 is identical to the packet shown in FIG. 15 with the network address field rotated. Controller 130 forms a new packet which is identical to that shown in FIG. 15 with the exception that the start bit, network address and network packet length fields have been eliminated and a new CRC field has been calculated and inserted. Controller 130 then transmits this new packet via trunk 117 to concentrator 112.

It would be obvious to one skilled in the art to expand network 116 as shown in FIG. 10 to be capable of terminating more trunks by the addition of more switching nodes. In addition, it would be obvious to one skilled in the art to use such a switching network to interconnect several pieces of digital equipment such as computers or terminals. The other switching networks and concentrators shown in FIGS. 1 and 2 are similar in design to switching network 116.

Switching node 1000-15 is illustrated in greater detail in FIG. 16. The other switching nodes are identical in design to node 1000-15. Node 1000-15 consists of four input controls 1200 through 1203 which can transmit information to any one of four output controls 1204 through 1207. The input controls 1200 through 1203 are connected to the output controls 1204 through 1207 via cables 1208 and 1212 through 1214. For example, input control 1200 is connected to output control 1207 via cable 1208. The latter comprises three conductors 1209, 1210, and 1211. The other interconnecting cables on FIG. 16 are identical in design to cable 1208.

When control 1200 has a packet to transmit to control 1207, it first interrogates control 1207 to determine if that control can accept data by transmitting a request signal via conductor 1210 to control 1207. Note, control 1200 continuously transmits this request signal until the entire packet has been transmitted to control 1207. When control 1207 is free to receive information from control 1200, control 1207 transmits a grant signal via conductor 1211 to control 1200. Upon receipt of the grant signal, control 1200 commences to transmit the packet to control 1207 via conductor 1209.

For example, the packet of FIG. 13 is transmitted through node 1000-15 of FIG. 16 in the following manner. When control 1200 recognizes the start bit, it would have already received not only the start bit but also the two most significant bits of the network address since the recognition operation is delayed until the start bit, network packet length field, and network address field are received by control 1200. Control 1200 then decodes the two most significant bits of the network address field and determines that the packet is to be transmitted to control 1207 via cable 1208. Control 1200 requests permission to start transmission via conductor 1210; and when control 1207 returns the grant signal via conductor 1211, control 1200 starts the transmission of the packet to control 1207 via cable 1208. Before transmitting the network address field, control 1200 left rotates the two most significant address bits so that the network address transmitted is that of FIG. 14. Upon receipt of the start bit of that packet, control 1207 retransmits that packet out on terminal 1016. Note, control 1207 had to be received via output link 1016 permission from switching node 1001-15 to start transmission.

Figure 17:
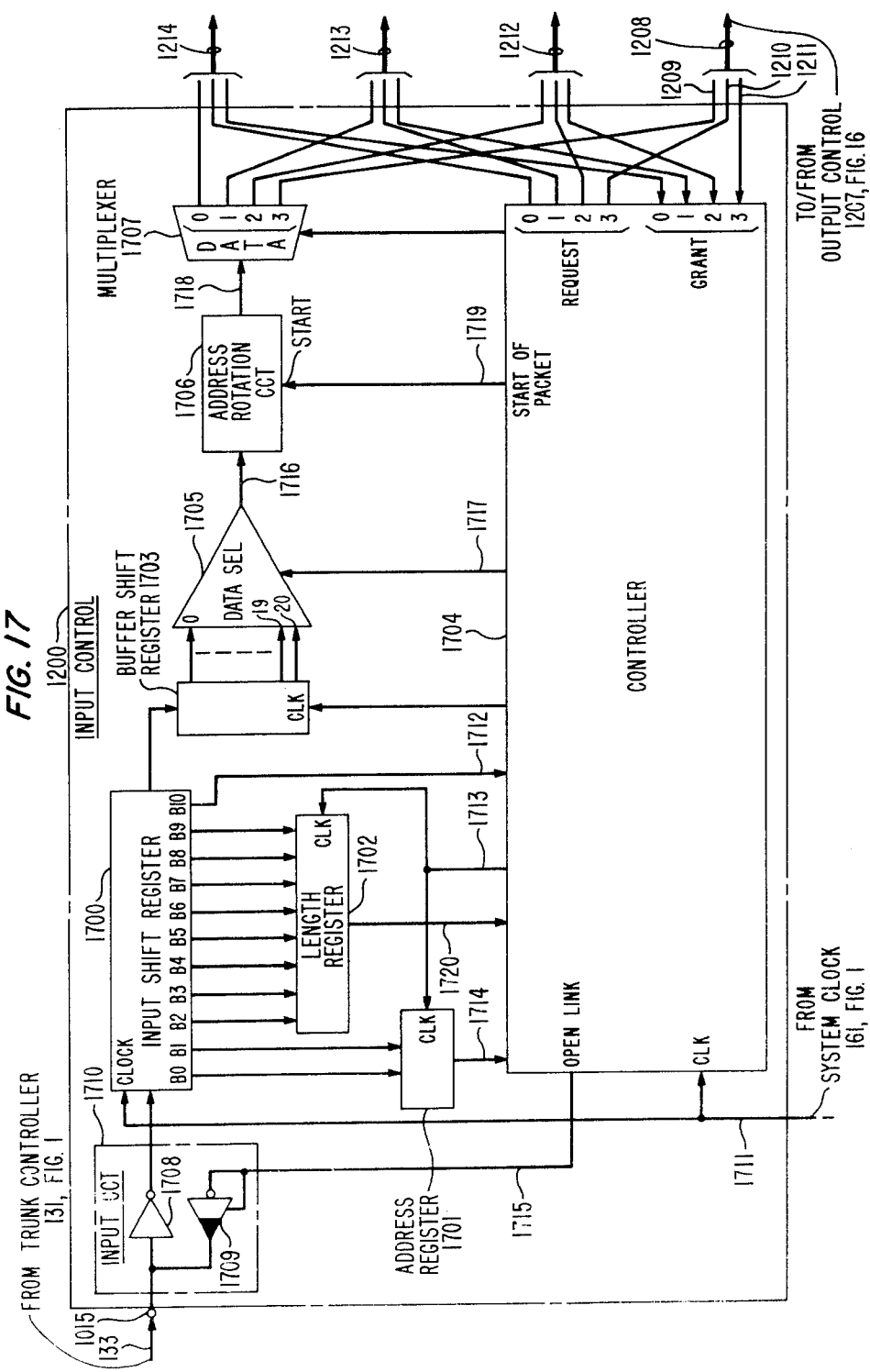
FIGS. 17 through 19 are detailed block diagrams of subsystems which are contained in switching node 1000-15.

Input control 1200 of FIG. 16 is shown in greater detail in FIG. 17. Input circuit 1710 receives information, for example the packet of FIG. 13, from trunk controller 121 via input terminal 1015. As described later, input shift register 1700 is used to detect the start bit, to extract the network packet length field which is saved in length register 1702, and to extract the two most significant bits of the network address field which are saved in address register 1701. Buffer shift register 1703 can buffer one complete packet. In addition, provision is made for storing less than a complete packet by providing an output from shift register 1703 every 64 bit positions. These outputs are selected by data selector 1705 under control of controller 1704 to bypass portions of shift register 1703. When it is not necessary to buffer a whole packet before transmission of the packet to the output circuit commences, this bypassing is done to speed up the transfer of a packet through input control 1200. Address rotation circuit 1706 performs the previously mentioned left rotate operation on the network address field before this address is transmitted with the remainder of the packet to the selected one of output controls 1204 through 1207. Multiplexor 1707 under control of controller 1704 selects one of the cables 1208, 1212, 1213 or 1214 and transmits data on the selected cable. Controller 1704 advantageously comprises a PLA and flip-flops in a VLSI circuit or a programmable logic array (PLA) such as the Signetic, Corp.'s 82S100 with additional flip-flop circuits.

The operation of input control 1200 will now be further explained by using the previous example which dealt with the transmission of the packet of FIG. 13. Input shift register 1700 is continuously being clocked by the system clock via conductor 1711. As the start of the packet is received via input 1015, the packet's data is clocked through shift register 1700. Once the start bit reaches bit position B9 of shift register 1700, controller 1704 detects this bit via conductor 1712 and transmits a pulse on conductor 1713 which causes length register 1701 to store the network packet length field, B2 through B8, and address register 1702 to store the two most significant bits of the network address field B0 and B1.

After decoding the contents of address register 1701, controller 1704 transmits a request via conductor 1210 since the two most significant address bits being equal to a binary "11" indicate that the packet is to be transmitted to output control 1207 of FIG. 16. The packet's data is shifted from input shift register 1700 to buffer shift register 1703 under control of controller 1704. When controller 1704 receives a grant signal from output control 1207 via conductor 1211, controller 1704 then calculates at which buffer shift register 1703 output the start bit of the packet is approaching within that register. On the basis of this calculation, controller 1704 controls data selector 1705 via cable 1717 to select the calculated output of shift register 1703. Data selector 1705 transmits the data from the selected output to address rotation circuit 1706 via conductor 1716 after resetting address rotation circuit 1706 by transmitting the start of packet signal via conductor 1719. Controller 1704 then uses the packet length information stored in length register 1702 which it reads via cable 1720 to determine when the end of the packet has entered shift register 1700. When this occurs and transmission has commenced from shift register 1703, controller 1704 transmits the link open signal via conductor 1715. This signal is retransmitted via the tristate driver 1709 via conductor 1015 to trunk controller 131. The link open signal indicates that the input control is now ready to receive another packet. This function is explained in the section dealing with the output control circuit as described in FIG. 19.

Figure 18:
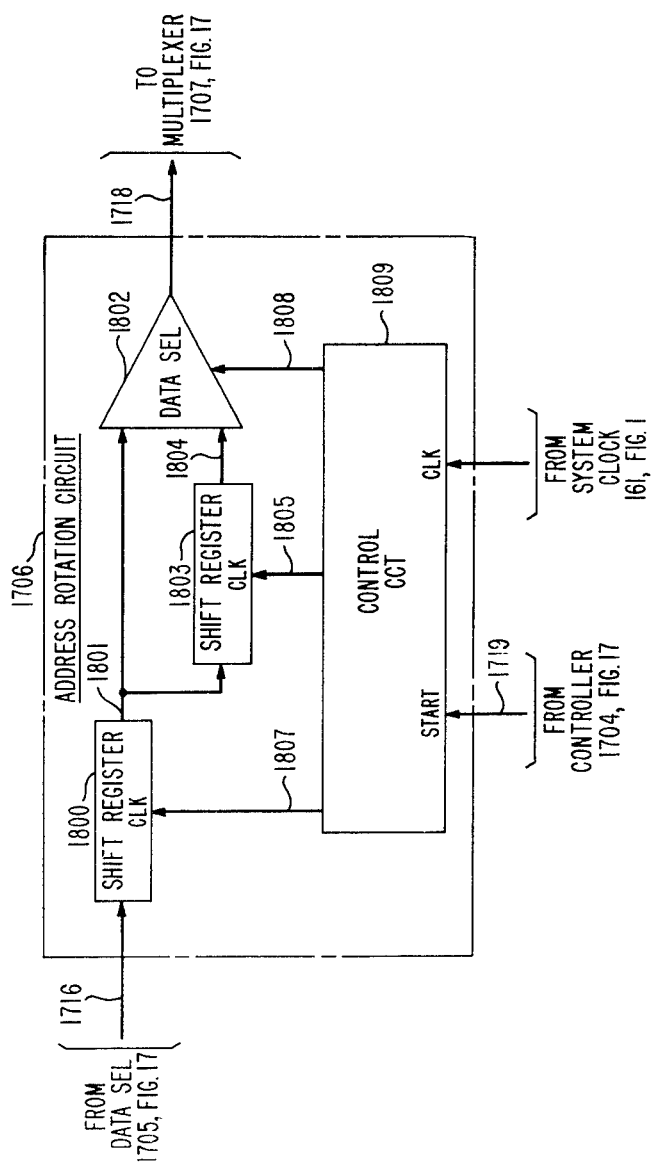

Address rotation circuit 1706 is illustrated in greater detail in FIG. 18. Circuit 1706 effects the rotation of the two most significant address bits to the two least significant address bit position. This function is performed by storing the two most significant address bits in shift register 1803 and at the appropriate place in the bit stream reinserting these bits. The following describes in greater detail how this function is implemented. When control circuit 1809 receives the start of packet signal from controller 1704 via conductor 1719, it transmits clock pulses which are derived from the system clock 161 of FIG. 1 via conductor 1807 to shift register 1800 and 1803. Initially, control circuit 1809 conditions data selector 1802 via conductor 1808 to select shift register 1803's output to be transmitted on conductor 1718. Control circuit 1809 then counts the number of bits which are being transmitted via conductor 1718; and when the two most significant bits of the network address field are contained within shift register 1803, control circuit 1809 ceases to transmit clock pulses to shift register 1803 and conditions data selector 1802 to select the shift register 1800's output. Control circuit 1809 then waits until the remaining bits of the network address field have been transmitted via conductor 1718. At this point in time, control circuit 1809 commences to send clock signals to shift register 1803 and conditions data selector 1802 to select the output of shift register 1803. Control circuit 1809 advantageously comprises a PLA and flip-flops in a VLSI circuit or a PLA such as the Signetics, Corp.'s 82S100 with additional flip-flop circuits.

Figure 19:
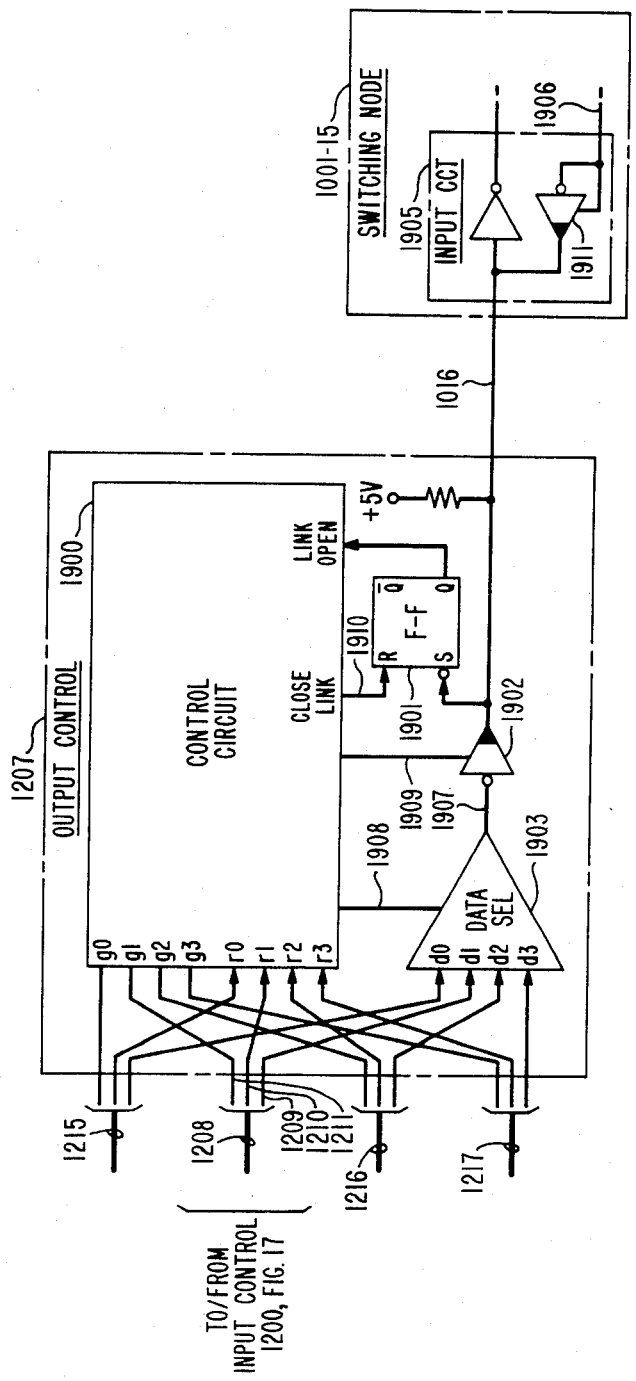

Output control 1207 is shown in greater detail in FIG. 19. Control circuit 1900 responds to a request from one of the input controls 1200 through 1203 which is transmitted via cables 1208, 1215, 1216, or 1217. If flip-flop 1901 is set, control circuit 1900 responds to the request by transmitting a grant signal back to the requesting input control via one of the above mentioned cables. After acknowledging the request, control circuit 1900 conditions data selector 1903 to select the data conductor from the above-identified one of cables 1208, 1215, 1216, or 1217. Control circuit 1900 transmits the appropriate control information to data selector 1903 via the cable 1908. Data selector 1903 transfers the packet data received on the selected input terminal to conductor 1907 from which tri-state device 1902 retransmits via link 1016 to input circuit 1905 which is part of switching node 1001-15 of FIG. 10. Control circuit 1900 controls the output of tri-state device 1902 via conductor 1909. Control circuit 1900 advantageously comprises a PLA and flip-flops in a VLSI circuit or a PLA such as the Signetics, Corp.'s 82S100 with additional flip-flop circuits.

The operation of output control 1207 as shown in FIG. 19 explained in greater detail by considering the previous example of input control 1200 transmitting the data packet of FIG. 13 to output control 1207 via cable 1208. When input control 1207 transmits the request signal via conductor 1210, control circuit 1900 transmits a grant signal to input control 1200 via conductor 1211 if link 1016 is idle which is indicated by flip-flop 1901 being set to a "1". The steps for controlling that flip-flop are discussed later in this section. First, considering the case when flip-flop 1901 is set to a "1", the control circuit 1900 transmits the grant signal to input control 1200, conditions data selector 1903 via cable 1908 to select the data being transmitted on conductor 1209, and retransmits that data on conductor 1907 to tri-state device 1902 of node 1001-15. In addition, control circuit 1900 enables the tri-state device 1902 to transfer the information on conductor 1907 to conductor 1016.

After input control 1200 has transmitted the entire packet, it removes the request signal from conductor 1210. Once the request signal is removed from conductor 1210, control circuit 1900 switches tri-state device 1902 to its high impedance state by no longer transmitting a signal to device 1902 via conductor and resets flip-flop 1901 via conductor 1910 which indicates that link 1016 is busy. With device 1902 in the high impedance state, flip-flop 1901 is set at a later point in time by node 1001-15 via link 1016 as described later in this section.

The second case is when flip-flop 1901 is set to a "0" indicating that node 1001-15 cannot receive a packet from output control 1207. If flip-flop 1901 is set to a "0", control 1207 does not transmit the grant signal to input control 1200 until that flip-flop is set to "1".

Consider now, how node 1001-15 sets flip-flop 1901 to a "1". Once the input control of the switching node 1001-15 is capable of accepting another packet, it transmits the open link signal via conductor 1906, tri-state device 1911, and conductor 1016 after enabling tri-state device 1911 to transmit data on link 1016. The open link signal sets flip-flop 1901 via the S input. Once flip-flop 1901 is set, control circuit 1900 can once again respond to request signals from the input controls.

Trunk controller 131 is shown in greater detail in FIG. 20. The other trunk controllers are similar in design to trunk controller 131. Trunk controller 131 receives packets from trunk 118 via receiver 2002 and transmits packets to trunk 118 via transmitter 2003. Trunk controller 131 receives packets from switching network 116 via input circuit 2006 and transmits packets to switching network 116 via output circuit 2005. Address control 2004 and memory 2001 are used to buffer packets. Packets are buffered in memory 2001 in one of four distinct buffers—trunk test buffer, switch test buffer, receive buffer, and transmit buffer. Address control 2004 maintains address pointers for each of these buffers which define where the packets are stored within any particular buffer and upon the receipt of a write or a read performs the necessary operation on the basis of these address pointers.

Receiver 2002 receives information from trunk 118 at a 1.54 Mbs rate. Receiver 2002 takes the serial information and transforms the serial data into a byte. Once receiver 2002 has assembled a byte, it transmits a write request via control bus 2008 and the byte via data bus 2007 to address control 2004. Address control 2004 responds to these signals by performing a write operation into memory 2001 at the location designated by the address pointers associated with receiver 2002. Receiver 2002 continues the transfer of bytes of data via data bus 2007 to address control 2004 until the packet has been entirely transmitted. After the entire packet has been transferred to memory 2001, receiver 2002 transmits an end packet signal via control bus 2008 to address control 2004. Assuming the receiver buffer was used to store the packet, address control 2004 transmits via control bus 2012 a packet available signal to output circuit 2005. Address control 2002 continuously transmits this packet available signal to output circuit 2005 as long as there is a completed packet in receiver buffer of memory 2001.

Output circuit 2005 reads the packet stored in memory 2001 by making sequential read requests to address control 2004 via control bus 2012 for reading from the receiver buffer. Address control 2004 maintains a pointer which determines which word in memory 2001 is associated with the packet to be transmitted to the network via output circuit 2005. Output circuit 2005 accesses and transmits data from memory 2001 at an 8 Mbs rate.

Upon the start of the transmission of a packet by output circuit 2005 to switching node 1000-15, output circuit 2005 froms network packets similar to those shown in FIG. 9. In order to assemble network packets, output circuit 2005 must extract the contents of network address field from the address field of the original packet such as shown in FIG. 7 and calculate the network packet length field. In addition, output circuit 2005 must calculate a new CRC field and a start bit. Output circuit 2005 does this in a serial manner and does not buffer an entire packet before transmitting it via conductor 133 to switching node 1000-15.

Input circuit 2006 receives packets from switching node 1002-15 via conductor 132. Input circuit 2006 forms this data into bytes and requests that each byte be written by transmitting the data and write request signal via data bus 2013 and control bus 2014, respectively, to address control 2004. Address control 2004 writes this information into memory 2001 utilizing memory address bus 2017, memory data bus 2015, and memory control bus 2016. Packets are written into the transmit buffer if they are to be retransmitted on trunk 118 or into the switch test buffer if they are to be retransmitted to network 116. Input circuit 2006 uses the network packet length field to determine when an entire packet has been stored in memory 2001.

When an entire packet has been stored in memory 2001, input circuit 2006 transmits via control bus 2014 an end of packet signal to address control 2004. Address control 2004 transmits to transmitter 2003 a packet available signal which transmitter 2003 responds to by requesting the transmission of the next packet to be transmitted out on trunk 118. Transmitter 2003 makes its request via control bus 2010 and receives information via data bus 2009. Transmitter 2003 strips off network address field, network packet length field, and CRC field as shown for example in FIG. 9 before transmitting the packet via conductor 1026. Transmitter 2003 also makes the necessary error checks to determine whether or not an error has occurred in the transmission of the packet in the network and recalculates a new CRC field. Transmitter 2003 retransmits the packets stored in memory 2001 at a 1.54 Mbs rate.

It is to be understood that the above-described embodiment is merely illustrative of the principles of the invention and that other arrangements may be devised by those skilled in the art without departing from the spirit and scope of the invention.

What is claimed is:

1. In a packet communication system for switching packets of digital signals with each of said packets having an address field defining a communication path through said system and a data field and said system comprising:
- a plurality of terminals;
- the invention comprising:
- processor means;
- packet switching network means operable for establishing path connections for a call setup packet from a first one of said terminals to said processor means in response to the address field of said call setup packet;
- said processor means responsive to a receipt of said call setup packet for supplying address information in the data field of said call setup packet to effect an operation of said network means for the establishment of path connections communicating from said first one of said terminals to a second one of said terminals and to communicate said call setup packet to said second one of said terminals;
- route address means for said first and second ones of said terminals for effecting the storage of said address information following a receipt of said call setup packet at said second terminal; and
- said packet switching network being subsequently operable independent of said processor means under control of said stored address information inserted into subsequent ones of said plurality of packets for establishing path connections between said first and second terminals to communicate said subsequent packet therebetween.

2. A packet communication system for switching packets of digital signals between terminals with each of said packets having an address field defining a communication path through said system and a data field, and said system comprising:
- a plurality of terminals;
- processor means;
- packet switching network means operable for establishing path connections for a call setup packet from a first one of said terminals to said processor means in response to the address field of said call setup packet;
- said processor means responsive to a receipt of said call setup packet from said first one of said terminals for supplying address information in the data field of said network means for the establishment of path connections from said first one of said terminals to a second one of said terminals and to communicate communicating said call setup packet to said second one of said terminals; and
- control means responsive to a receipt of said call setup packet at said second one of said terminals for transmitting a call-reply packet containing said address information in said data field thereof.

3. A packet communication system according to claim 2 wherein said control means cooperates with said packet switching network means for establishing path connections through said network means to communicate said call-reply packet to said first one of said terminals.

4. A packet communication system according to claim 2 wherein said packet switching network comprises:
- a plurality of packet switches responsive to said information in said address field of said call-reply packet for communicating said call-reply packet to said first one of said terminals.

5. A packet communication system according to claim 4 further comprising:
- route address means for said first one of said terminals responsive to said call-reply packet to store said address information therein.

6. A packet communication system according to claim 5 further comprising:
- route address means for said second one of said terminals for storing said address information.

7. A packet communication system according to claim 2 further comprising:
- a plurality of interface facility means;
- and wherein said packet switching network means comprises:
- a plurality of packet switches is responsive to a receipt of address information in a data packet from one of said interface facility means for establishing a packet switch path connection to another one of said interface facility means.

8. A packet communication system according to claim 7 wherein:
- each of said packet switches comprises input means and output means; and
- each of said interface facility means connected to individual input means of one of said packet switches and to an individual output means of another one of said packet switches.

9. A packet communication system according to claim 8 wherein
- said processor means comprises a central processor connected to one of said interface facility means and being responsive to a receipt of said call setup packet for supplying a portion of said address information.

10. A packet communication system according to claim 9 further comprising:
- a plurality of access controllers, each of said controllers being connectable individually to one of said plurality of terminals;
- and wherein
- said processor means further comprises another processor means responsive to a receipt of said call setup packet for supplying another portion of said address information; and
- said packet switching network means further comprises concentrator means for connecting said access controllers to said other processor means and to ones of said interface facility means.

11. A packet switch according to claim 10 wherein each of said access controllers comprises:
- route address means for storing said address information; and
- a receiver for communicating packets received from said connected terminal to concentrator means;
- said route address means of said each access controller is responsive to each of said received packets to insert said stored address information.

12. A packet switching system serving a plurality of customer terminals for transmitting packets of digital signals with each of said packets having an address field defining the route through said system and a data field, said system comprising;
- a switching office having a first central processor and having a plurality of interconnected packet switches with each of said packet switches responsive to the address fields of received packets to transmit those packets through the packet switch;
- a first and a second of said customer terminals connected to said first switching office;

said packet switches responsive to the address field of a call setup one of said packets for transmitting said call setup one of said packet to said first central processor;

said first central processor having a first means responsive to said call setup one of said packets from said first customer terminal to calculate the address information for routing subsequent ones of said packets between said first and second customer terminals and having a second means for inserting said address information into said data field of said call setup packet and a third means for transmitting said call setup packet to said second customer terminal; and said second customer terminal having a first means being responsive to said call setup one of said packets to store said address information and a second means for transmitting a call-reply one of said packets containing said address information in said address and data fields to said first customer terminal.

13. The invention of claim 12 wherein said plurality of packet switches are responsive to said address field of said call-reply one of said packets to transmit said call-reply one of said packets to said first customer terminal.

14. The invention of claim 13 wherein said first customer terminal further comprises a route address memory; and said route address memory is responsive to said one call-reply of said packets to store said address information.

15. The invention of claim 12 wherein said packet switching system further comprises:

a second switching office connected to said first switching office having a second central processor and having another plurality of interconnected packet switches with each of said packet switches responsive to the address fields of each of said packets to transmit those packets through the packet switch;

a third one of said customer terminals connected to said second switching office;

said other plurality of packet switches responsive to the address field of a second call setup one of said packets from said first customer terminal transmitted via said first switching office to transmit said second call setup one of said packets to said second central processor;

said second central processor having a first means responsive to said second call setup one of said packets transmitted from said first customer terminal via said first switching office to calculate the address information necessary to route packets between said first and said third customer terminals via said other plurality of interconnected packet switches and having a second means for inserting said second address information into said data field of said second call setup one of said packets and a third means for transmitting said second call setup one of said packets to said third customer terminal; and said third customer terminal having first means responsive to said second call setup one of said packets to store said second address information and having second means for transmitting said second call-reply one of said packets containing said second address information in said address and data fields of said second call-reply one of said packets to said second switching office.

16. The invention of claim 14 wherein said first customer terminal is further connectable to a telephone set;

said telephone set comprising means for transmitting analog voice signals to said first customer terminal;

said first customer terminal further comprising a first means responsive to said analog voice signals to convert said analog signals to digitally encoded voice signals; and said first customer terminal further comprising a second means responsive to said analog voice signals to continuously assemble packets of said digitally encoded voice signals and said address information stored in said route address memory and a third means for transmitting each of said packets of digitally encoded voice signals to said first switching office, whereby said packets of digitally encoded voice signals are transmitted to said second customer terminal.

17. A telecommunication switching system for transmitting packets of digitally encoded voice signals and digital data signals between a plurality of customer terminal units with each of said packets having an address field which defines the route of the packet through the switching system, a data field and each of said customer terminal units connectable to a telephone set and a source of data signals, said system comprising:

a first and second switching office with each of said offices having a central processor and a switching network, and each switching network having a plurality of interconnected packet switches;

a transmission means for interconnecting said first and second offices;

a first one of said customer terminal units connected to said first office and being responsive to a number from the connected telephone set to assemble a call setup packet containing said number in the data field and address signals identifying said central processor of said first office in the address field and to transmit said call setup packet to said switching network of said first office;

said switching network of said first office responsive to the address field of said call setup packet to communicate said call setup packet to said central processor of said first office;

said central processor of said first office having a first means responsive to said number contained in said call setup packet to calculate a first address for defining a first portion of said route through said switching network of said first office and a second means for inserting said first address into said data field and a third means for inserting other address signals identifying said central processor of said second office into said address field of said call setup packet and fourth means for transmitting said call setup packet to said second office; and said switching network of said second office responsive to the address field of said call setup packet to communicate said call setup packet to said central office of said second office;

said central processor of said second office having a first means responsive to said number contained in said call setup packet to calculate a second address for defining a second portion of said route through said switching network of said second office and a second means for inserting said second address into said data field, and a third means for transmitting said call setup packet to a second one of said customer terminal units.

18. The invention of claim 17 wherein said second one of said customer terminal units having a first means responsive to said call setup packet to read and store said first and second addresses from said data field, a second means for assembling a call-reply packet containing said first and second address in the address and data fields, and a third means for transmitting a call-reply packet to said switching network of said second office;

said switching network of said second office responsive to said second address in said address field to transmit said call-reply packet via said second portion of said route to said switching network of said first office; and said switching network of said first office responsive to said first address in said address field to transmit said call-reply packet via said first portion of said route to said first one of said customer terminal units.

19. The invention of claim 18 wherein said first one of said customer terminal units further comprises a route address memory; and said first one of said customer terminal units responsive to said call-reply packet to store said first and second addresses in said route address memory.

20. The invention of claim 19 wherein said switching network of said second office further comprises first interface facility means connected to said second one of said customer terminal units and second interface facility means connected to said switching network of said first office via a transmission means;

said first interface facility means having means responsive to said call-reply packet to read said second address information from said address field and means for assembling an intranetwork packet comprising said second address followed by the remainder of said call-reply packet;

said interconnected packet switches in said second portion of said route responsive to said second address of said intranetwork packet to transmit said intranetwork packet to said second interface facility means; and said second interface facility means responsive to said intranetwork packet to remove said second address and to transmit said call-reply packet to said first office.

21. The invention of claim 20 wherein said first interface facility means transmits said intranetwork packet bit serially.

22. The invention of claim 21 wherein each of said packet switches in said second portion of said route responsive to the two most significant bits of said intranetwork packet to transmit said intranetwork packet to the next sequential packet switch.

23. The invention of claim 22 wherein each of said packet switches in said second portion of said route further comprises means responsive to said intranetwork packet to rotate said second address so that said most significant bits become the least significant bits of said second address before transmission of the intranetwork packet to the next sequential packet switch.

24. A method of routing packets of digital signals with each of said packets having an address field defining the communication path through a packet switching system and a data field, said packet switching system comprises a plurality of terminals each having route address means interconnected by a packet switching network means being operable for establishing packet connections for packet communications and a processor means connected to said switching network means;

the invention comprising the steps of:

transmitting a call setup packet from a first one of said customer terminals to said switching network means;

communicating said call setup packet to said central processor in response to said address field by said switching address means;

supplying address information in the data field of said call setup packet to effect an operation of said network means by said processor means in response to said call setup packet;

establishing a path of connections for communicating said call setup packet to a second one of said terminals by said processor means;

effecting the storing of said address information following the receipt of said call setup packet at said second one of said terminals in said route address means of said first and said second ones of said terminals; and inserting said stored address information into subsequent ones of said packets by said first terminal for establishing path connections between said first and second terminals to communicate said subsequent packets therebetween.

25. The invention of claim 24 wherein said second customer terminal further comprising a control means for the assembling and transmission of packets and further comprising the steps of assembling a call-reply one of said packets by inserting said address information in said address and data fields thereof by said control means; and transmitting said call-reply packet to said first one of said terminals by said control means.

26. The invention of claim 25 further comprising the step of establishing path connections through said network means in response to said address field of said call-reply packet.

27. The invention of claim 26 wherein said packet switching network comprises a plurality of packet switches and said step of establishing a path further comprises the steps of reading said address field of said call-reply packet by each of said packet switches in said established path; and transmitting said call-reply packet to the next sequential packet switch by each of said packet switches in said established path in response to the read address field of said call-reply packet.

28. The invention of claim 27 further comprising the step of storing said address information of said call-reply packet in said route address means of said first one of said terminals.

29. The invention of claim 27 further comprising the step of storing said address information of said call setup packet in said route address means of said second one of said terminals.

30. A method of routing packets of digital signals with each of said packets having an address field defining the route through a packet switching system and a data field, said packet switching system comprises a plurality of customer terminals and a switching office comprising a central processor and a plurality of interconnected packet switches with each of said packet switches responsive to the address fields of one of said received packets to transmit that packet through the packet switch, and said switching office interconnecting said plurality of customer terminals, and comprising the following steps:

transmitting a call setup packet from a first one of said customer terminals to said packet switches;

communicating said call setup packet to said central processor in response to the address field of said call setup packet by said packet switches;

calculating the address information necessary to define a route for transmitting packets between said first customer terminal and a second one of said customer terminals by said processor in response to said call setup packet;

inserting said address information into said data field of said call setup packet by said processor for transmission to said second customer terminal;

storing said address information in said second customer terminal in response to the receipt of said call setup packet; and transmitting a call-reply packet containing said address information in said address and data fields to said first customer terminal via first plurality of interconnected packet switches.

31. The invention of claim 30 further comprising the step of storing the address information contained in said data field of said call-reply packet in said first customer terminal.

32. The invention of claim 30 wherein said packet switching system comprising a first central processor, a first switching office and a first plurality of interconnected packet switches and further comprising a second switching office connected to said first switching office and said second switching office comprising a second central processor and a second plurality of interconnected packet switches connected to a third one of said customer terminals, and further comprising the steps of transmitting packets to said third customer terminal by:

transmitting a second call setup packet from said first customer terminal to said second central processor via said first and second switching offices;

calculating the address information necessary to route packets between said first and said third customer terminals via said second plurality of interconnected packet switches by said second processor in response to the receipt of said second call setup packet;

inserting said second address information into said data field of said second call setup packet by said second processor for transmission to said third customer terminal; and storing of said second address information by said third customer terminal in response to the receipt of said second call setup packet.

33. The invention of claim 32 further comprising the step of transmitting a second call-reply packet containing said second address information in said address and data fields to said second switching office by said third customer terminal; and routing of said second call-reply packet through said second plurality of packet switches in response to said address field of said second call-reply packet to said first plurality of packet switches.

34. The invention of claim 33 further comprising the step of routing said second call-reply packet through said first plurality of packet switches in response to said second address information in said address field of said call-reply packet to said first customer terminal.

35. The invention of claim 34 further comprising the step of storing said address information contained in said data field of said second call-reply packet in said first customer terminal.

36. The invention of claim 31 further comprising the step of transmitting analog voice signals from a telephone set connected to said first customer terminal to said first customer terminal;

converting said analog voice signals to digitally encoded voice signals by said first customer terminal;

assembling packets of said digitally encoded voice signals in response to said conversion; and inserting into said assembled packets of digitally encoded voice signals said first address information stored in said first customer terminal for transmission of said assembled packets to said first switching office.

37. The invention of claim 36 further comprising the steps of routing said assembled digitally encoded voice packets through said first plurality of interconnected packet switches to said second customer terminal;

converting the digitally encoded voice signals in said assembled digitally encoded voice packets into analog signals by said second customer terminal in response to the receipt of said assembled digitally encoded voice packets; and transmitting said converted analog signals to a second telephone set connected to said second customer terminal.

38. The invention of claim 30 wherein said first customer terminal connected to a telephone set and further comprising the step of transmitting a number from said telephone set to said first customer terminal; and inserting said number in said call setup packet.

39. The invention of claim 38 wherein the step of calculating further comprises the step of converting said number to said address information.

40. The invention of claim 30 wherein said step of transmitting said first call-reply packet through said first plurality of interconnected packet switches further comprises the steps of assembling an intranetwork packet comprising said address information defining the route through said first plurality of said interconnected packet switches followed by the remainder of said first call-reply packet; and transmitting said intranetwork packet to said first plurality of packet switches.

41. The invention of claim 40 wherein said step of transmitting said intranetwork packet further comprises the step of transmitting said intranetwork packet in a bit-serial manner.

42. The invention of claim 41 further comprising the step of decoding the two most significant bits of said intranetwork packet by each of said packet switches in said route through said first plurality of packet switches; and transmitting said intranetwork packet to the next sequential packet switch in said route through said first plurality of said interconnected packet switches.

43. The invention of claim 42 wherein the step of decoding said first address information of said intranetwork packet further comprises the step of rotating said two most significant bits of said intranetwork packet in such a manner that said two most significant bits become the two least significant bits of said first address information of said intranetwork packet.

* * * * *